(12) United States Patent
Jujjuru et al.

(10) Patent No.: US 11,843,839 B2
(45) Date of Patent: Dec. 12, 2023

(54) CLIENT-SIDE BLACKOUT USING MANIFEST MARKERS

(71) Applicant: Charter Communications Operating, LLC, St. Louis, MO (US)

(72) Inventors: Rosaiah Jujjuru, Centennial, CO (US); Vipul Patel, Parker, CO (US); David Agranoff, Golden, CO (US); Sachin Reddy Kota, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/592,255

(22) Filed: Feb. 3, 2022

(65) Prior Publication Data

US 2023/0247267 A1 Aug. 3, 2023

(51) Int. Cl.
| | |
|---|---|
| *H04N 21/8355* | (2011.01) |
| *H04N 21/45* | (2011.01) |
| *H04N 21/442* | (2011.01) |
| *H04N 21/454* | (2011.01) |

(52) U.S. Cl.
CPC ... *H04N 21/8355* (2013.01); *H04N 21/44204* (2013.01); *H04N 21/454* (2013.01); *H04N 21/4524* (2013.01)

(58) Field of Classification Search
CPC ......... H04N 21/8355; H04N 21/44204; H04N 21/4524; H04N 21/454
See application file for complete search history.

(56) References Cited

U.S. PATENT DOCUMENTS

2015/0074232 A1* 3/2015 Phillips ............ H04N 21/85406
709/219
2019/0230395 A1* 7/2019 Flanagan ........... H04N 21/6125

* cited by examiner

*Primary Examiner* — Yassin Alata
(74) *Attorney, Agent, or Firm* — Dority & Manning, P.A.

(57) ABSTRACT

A streaming service updates a manifest to include a location of an encoded version of a program that is available for streaming and a restriction marker indicating that the program is restricted. A request for the manifest is received from a client device. Subsequent to providing the manifest to the client device, a request for authorization to stream the program is received from the client device, the request for authorization including client device metadata. Based on the client device metadata and blackout metadata associated with the program, it is determined that the client device is not authorized to stream the program. The streaming service sends, to the client device, slate information that identifies a slate image to be presented by the client device in lieu of the program.

22 Claims, 9 Drawing Sheets

CLIENT-SIDE BLACKOUT USING MANIFEST MARKERS

BACKGROUND

A streaming service typically streams content pursuant to an agreement with a content provider. A content provider may impose restrictions on some content, such as a sporting event, that the content provider authorizes to be streamed to certain client devices but not to other client devices based on one or more criteria.

SUMMARY

The embodiments disclosed herein implement client-side blackout using manifest markers that eliminates a need for a streaming service to stream blackout video content to a client device that is not authorized to view a program.

In one embodiment a method is provided. The method includes updating, by a streaming service executing on a computer system comprising one or more processor devices of one or more computing devices, a manifest to include a location of an encoded version of a first program that is available for streaming and a restriction marker indicating that the first program is restricted. The method further includes receiving, from a first client device, a first request for the manifest. The method further includes subsequent to providing the manifest to the first client device, receiving, from the first client device, a first request for authorization to stream the first program, the first request for authorization comprising first client device metadata. The method further includes determining, based on the first client device metadata and blackout metadata associated with the first program, that the first client device is not authorized to stream the first program. The method further includes sending, by the streaming service to the first client device, slate information that identifies a slate image to be presented by the first client device in lieu of the first program.

In another embodiment computer system is provided. The computer system includes one or more computing devices, the one or more computing devices including one or more processor devices, the one or more processor devices configured to update a manifest to include a location of an encoded version of a first program that is available for streaming and a restriction marker indicating that the first program is restricted. The one or more processor devices are further configured to receive, from a first client device, a first request for the manifest. The one or more processor devices are further configured to, subsequent to providing the manifest to the first client device, receive, from the first client device, a first request for authorization to stream the first program, the first request for authorization comprising first client device metadata. The one or more processor devices are further configured to determine, based on the first client device metadata and blackout metadata associated with the first program, that the first client device is not authorized to stream the first program. The one or more processor devices are further configured to send, to the first client device, slate information that identifies a slate image to be presented by the first client device in lieu of the first program.

In another embodiment a method is provided. The method includes sending, by a client device comprising a computing device and a processor device, to a streaming service, a manifest request for a manifest. The method further includes receiving, by the client device from the streaming service, the manifest, the manifest including location information that identifies a location of an encoded version of a first program and a restriction marker. The method further includes, in response to the manifest including the restriction marker, sending, by the client device to the streaming service, a first authorization request for authorization to stream the first program, the first authorization request including client device metadata. The method further includes receiving, by the client device from the streaming service, slate information that identifies a slate image, and presenting, by the client device on a display device, the slate image in lieu of the first program.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
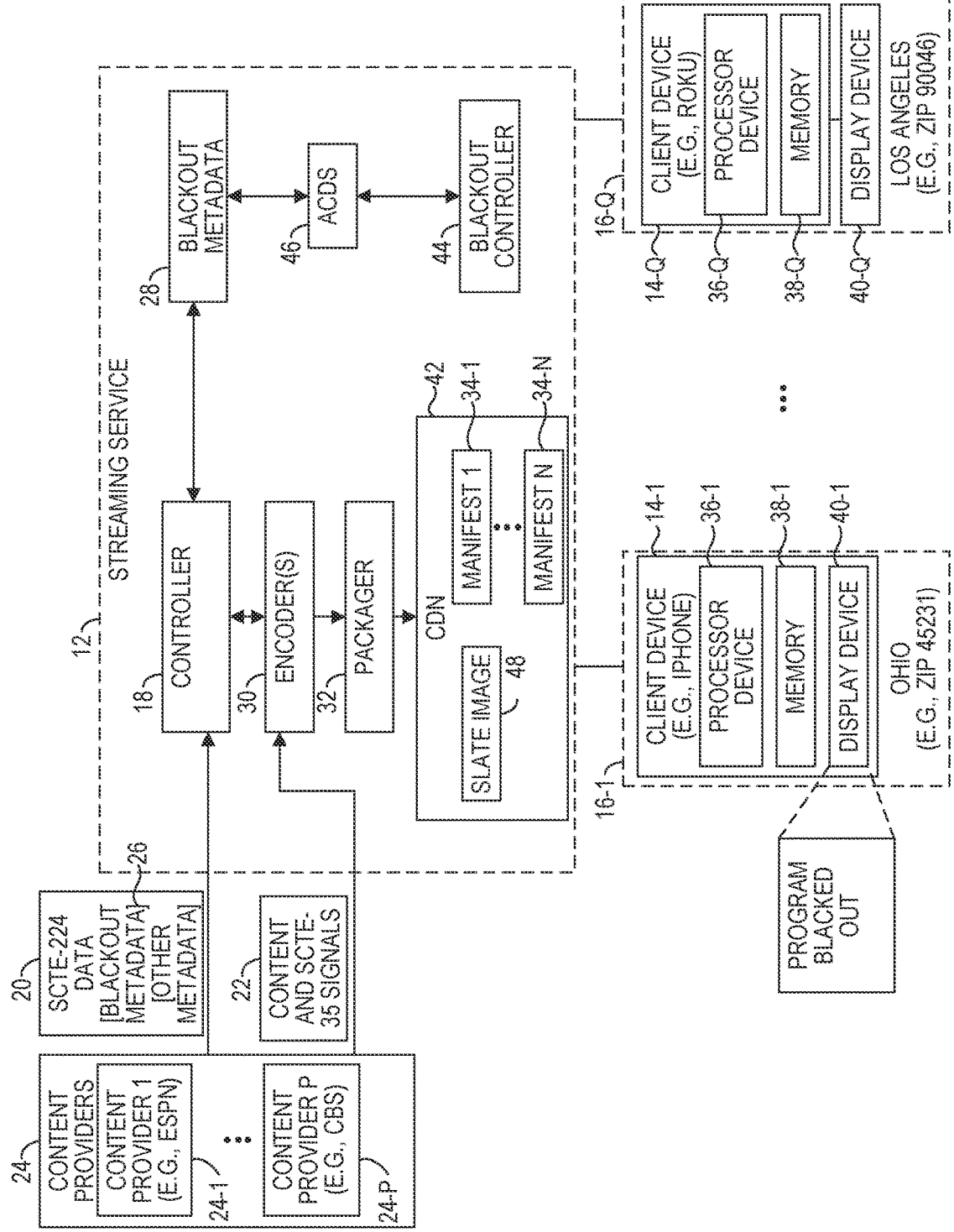
FIG. 1 is a block diagram of an environment in which client-side blackout using manifest markers may be practiced according to one embodiment.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

A streaming service typically streams content pursuant to an agreement with a content provider. A content provider may impose restrictions on some content, such as a sporting event, that the content provider authorizes to be streamed to certain client devices but not to other client devices based on one or more criteria. Such criteria may include, for example, a geographic location of the client device, a device type of the client device, or the like. In some situations, the streaming service may select alternate programming to provide to the client device. However, in other situations no other program may be available to be streamed. These situations are sometimes referred to as a blackout. In essence, the client device, so long as it is tuned to or otherwise remains on a particular channel or feed, will not be provided the desired program until the program ends, or unless the client device subsequently is authorized to receive the program. A streaming service, in place of the desired program, typically provides blackout content that indicates that the client device is not authorized to receive the program.

Because client devices do not distinguish between desired content and blackout content, the streaming service provides the blackout content to the client device in the same manner that the streaming service would provide the desired program. In particular, the streaming service continuously streams the blackout content to the client device, although the blackout content may be static and unchanging, such as a message indicating that the client device is not authorized to stream the desired content. Continuously streaming non-changing content utilizes substantial network bandwidth. It would be desirable for the client device to present a static image on the client device, which would eliminate the need to utilize network bandwidth to stream non-changing content.

The embodiments disclosed herein implement client-side blackout using manifest markers. A streaming service updates a manifest to include a location of an encoded version of a program and a restriction marker that indicates that the program is restricted. When a client device tunes or otherwise selects a particular channel or feed, the streaming service provides the manifest to the client device. The client device determines that the manifest includes the restriction marker. The client device makes a request for authorization to the streaming service and includes client device metadata. The client device metadata may include, for example, a device type of the client device and a location identifier, such as a zip code, GPS coordinates, or the like, that identifies a geographic location of the client device. The streaming service receives the request and determines whether the client device is authorized to stream the program. If not, the streaming service sends the client device slate information that identifies a slate image to be presented by the client device in lieu of the program. The slate information may comprise, for example, a uniform resource locator (URL) to a bitmapped image that includes information indicating that the program cannot be presented on the client device.

The client device may iteratively request the manifest to determine whether the program has terminated and a new program that is not restricted can be streamed by the client device. The client device may also iteratively request authorization to stream the program in the event that authorization criteria change, and the client device is subsequently authorized to present the program.

FIG. 1 is a block diagram of an environment 10 in which embodiments may be practiced. The environment 10 includes a streaming service 12. The streaming service 12 provides streaming content to a plurality of client devices 14-1-14-Q, which may be, at any instant in time, at various locations 16-1-16-Q throughout the world. The streaming service 12 will be described herein as comprising a plurality of components; however, it is apparent that the functionality described herein could be implemented in any number of components, including a fewer number of components than the number of components illustrated herein or a greater number of components than the number of components illustrated herein, and thus the functionality of any particular component of the streaming service 12 may be attributed herein generally to the streaming service 12.

In this example, the streaming service 12 includes a controller 18 that is configured to receive metadata 20 that describes characteristics of content 22 that is to be provided by a plurality of content providers 24-1-24-P (generally, content providers 24). The metadata 20 may be provided by the content providers 24, or may be provided by a third party. The metadata 20 may be in any desired format, including, by way of non-limiting example, SCTE-224 format. The metadata 20 includes blackout metadata 26 that identifies programs that have restrictions. A restricted program is a program that the streaming service 12 can stream to authorized client devices 14 but not to unauthorized client devices 14. The blackout metadata 26 also identifies criteria that the streaming service 12 uses to determine whether a client device 14 is authorized to receive the program. The criteria may include, by way of non-limiting example, one or more of a device type of the particular client device 14, a geographic location of the client device 14, or any other suitable or desirable criteria. In this example, the controller 18 stores the blackout metadata 26 as blackout metadata 28 in a suitable data structure for subsequent access, as will be discussed in greater detail herein.

The content providers 24 may continuously provide the content 22 to the streaming service 12. The content 22 includes programs and signals, such as program start signals and other signals, that may be used by the streaming service 12 to insert advertising into streaming content provided to the client devices 14, and for other reasons. The signals in the content 22 may be in any desired format. In some embodiments, the signals are in an SCTE-35 format. The blackout metadata 26 is typically provided to the streaming service 12 prior to the program to which the blackout metadata 26 corresponds is provided to the streaming service 12.

The content 22 may be processed by one or more encoders 30 that operate to receive programs from the content providers 24 and encode the content in a format suitable for streaming to the client devices 14. As an example, the encoder 30 detects a program start signal in the content received from the content provider 24-1. The program start signal contains a program identifier that identifies a program that follows the program start signal. The encoder 30 sends the program identifier to the controller 18. The controller 18 accesses the blackout metadata 28 and, in this example, determines that the program is restricted. In this context, the term "restricted" means that the blackout metadata 28 identifies the program as having a streaming restriction.

The controller 18 sends a message to the encoder 30 informing the encoder 30 that the program is restricted. The encoder 30 generates an encoded program suitable for streaming to the client devices 14. The encoder 30 informs a packager 32 of the location of the encoded program, and informs the packager 32 that the program is restricted. The packager 32 maintains a plurality of manifests 34-1-34-N (generally, manifests 34), each of which corresponds, respectively, to a channel or feed associated with a content provider 24-1-24-P. Each manifest 34 contains metadata about the programming associated with a particular channel, or feed. The manifests 34 may comprise data structures and/or files. The packager 32 updates the manifest 34-1, which corresponds to the content provider 24-1, with information that identifies the encoded program and updates the manifest 34-1 to include a restriction marker to indicate that the program is restricted. The packager 32 also updates the manifest 34-1 to include a program identifier. The information in the manifest 34-1 may identify a location of the encoded program. In some implementations, the encoded program may be divided into multiple segments, and the packager 32 inserts location information, such as uniform resource identifiers (URIs) or the like, for each of the segments into the manifest 34. Because the content 22 is continuously provided by the content providers 24, the encoder 30 continuously analyzes the content 22 and accompanying SCTE-35 signals, communicates with the controller 18 as appropriate, and provides information to the packager 32. The packager 32, in turn, updates the manifest 34-1 as new information is received from the encoder 30.

The client device 14-1 includes one or more processor devices 36-1, a memory 38-1 and includes, or is communicatively coupled to, a display device 40-1. The client device 14-1 may comprise any suitable device capable of communicating with the streaming service 12 and presenting content received from the streaming service 12 on the display device 40-1. By way of non-limiting example, the client device 14-1 may comprise a mobile device, such as a smartphone, a computing tablet, a desktop or laptop computer, or the like that executes a streaming service client application, or a web browser. The client device 14-1 may also comprise, for example, a special purpose streaming device, such as a Chromecast® streaming device, a Roku® streaming device, an AppleTV® streaming device, or the like. The client device 14-1 may also comprise, for example, a smart television that is capable of running streaming applications.

The client device 14-1 may initiate communications with the streaming service 12 to view content provided by the content provider 24-1. The client device 14-1 communicates with a content delivery network (CDN) 42 of the streaming service 12 to request the manifest 34-1 (sometimes referred to herein as a manifest request) that corresponds to the content provider 24-1. This may occur, for example, in response to a user manipulating the client device 14-1 to select a channel on which the streaming service 12 provides content from the content provider 24-1. In response to the request, the CDN 42 provides the manifest 34-1 to the client device 14-1. The client device 14-1 receives the manifest 34-1. The manifest 34-1 includes location information that identifies a location of an encoded version of the program currently being provided by the streaming service 12 on the channel that corresponds to the content provider 24-1, the restriction marker inserted by the packager 32 that indicates that the program is restricted, and the program identifier inserted by the packager 32. The restriction marker may comprise any suitable data. In some embodiments, the restriction marker comprises the marker "spliceType=ALT_CON".

The client device 14-1 determines that the manifest 34-1 includes the restriction marker and, in response, sends a request for authorization (sometimes referred to herein as an authorization request) to the streaming service 12 to determine if the client device 14-1 is authorized to stream the program. The authorization request includes the program identifier from the manifest 34-1 and client device metadata comprising data about the client device 14-1. The client device metadata may comprise, for example, location information that identifies a current location of the client device 14-1, and a device type that identifies the type of device of the client device 14-1. The location information may comprise any suitable information, such as global positioning system (GPS) coordinates of the client device 14-1, a zip code that identifies the zip code of the current location of the client device 14-1, or the like. The device type may identify the client device 14-1 as, for example, any one of a personal computer, a tablet computing device, a smart phone, a set top device, a Roku® device, an AppleTV® device, a SmartTV device, or the like.

A blackout controller 44 communicates with an alternate content decision system (ACDS) 46 and provides the program identifier and the client device metadata. The ACDS 46 accesses the blackout metadata 28 and, based on the restrictions associated with the program identified by the program identifier, and based on the client device metadata, determines whether the client device 14-1 is authorized to receive the program. For purposes of illustration, it will be assumed, in this example, that the ACDS 46 determines that the client device 14-1 is not authorized to stream the program.

The blackout controller 44 sends a message to the client device 14-1 that indicates that the program is blacked out for the client device 14-1. The message also includes slate information that identifies a slate image 48. As an example, the slate information may comprise a URI to the slate image 48. The slate image 48 may comprise, by way of non-limiting example, a static bitmapped graphic image.

The slate image 48 may comprise, by way of non-limiting example, an image file format comprising one of JPEG/JFIF format, a JPEG 2000 format, an Exif format, a TIFF format, a GIF format, a BMP format, a PNG format, a PPM, PGM, PBM, or PNM format, a WebP format, an HDR raster format, a HEIF format, or a BAT format. The slate image 48 may include information that indicates that the program is blacked out. The client device 14-1 receives the message and accesses the slate image 48. The client device 14-1 presents the slate image 48 on the display device 40-1 in lieu of the program identified in the manifest 34-1.

As will be discussed in greater detail below, the client device 14-1 may continue to present the slate image 48 on the display device 40-1 in lieu of the program until one of several different events occurs. However, while the slate image 48 is being presented on the display device 40, the streaming service need not stream the slate image 48 to the client device 14-1, thereby reducing network bandwidth and processing cycles that would otherwise be necessary to provide the client device 14-1 information that indicates that the program is blacked out.

The client device 14-Q comprises a processor device 36-Q, a memory 38-Q, and is communicatively coupled to a display device 40-Q. Substantially concurrently with the request for the manifest 34-1 made by the client device 14-1, the client device 14-Q similarly requests the manifest 34-1. The CDN 42 provides the manifest 34-1 to the client device 14-Q. The client device 14-Q receives the manifest 34-1, determines that the manifest 34-1 includes the restriction marker, and, in response, sends an authorization request to the streaming service 12 to determine if the client device 14-Q is authorized to stream the program. The authorization request includes the program identifier from the manifest 34-1 and client device metadata comprising data about the client device 14-Q. The blackout controller 44 communicates with the ACDS 46, and the ACDS 46 accesses the blackout metadata 28. Based on the restrictions associated with the program identified by the program identifier, and the client device metadata, the ACDS 46 determines that the client device 14-Q is authorized to receive the program. The blackout controller 44 sends a message to the client device 14-Q that indicates that the program is not blacked out for the client device 14-Q. The client device 14-Q receives the message and accesses the location information in the manifest 34-1 that identifies the location of the program. The client device 14-Q accesses the program and presents the program on the display device 40-Q.

Figure 2A:
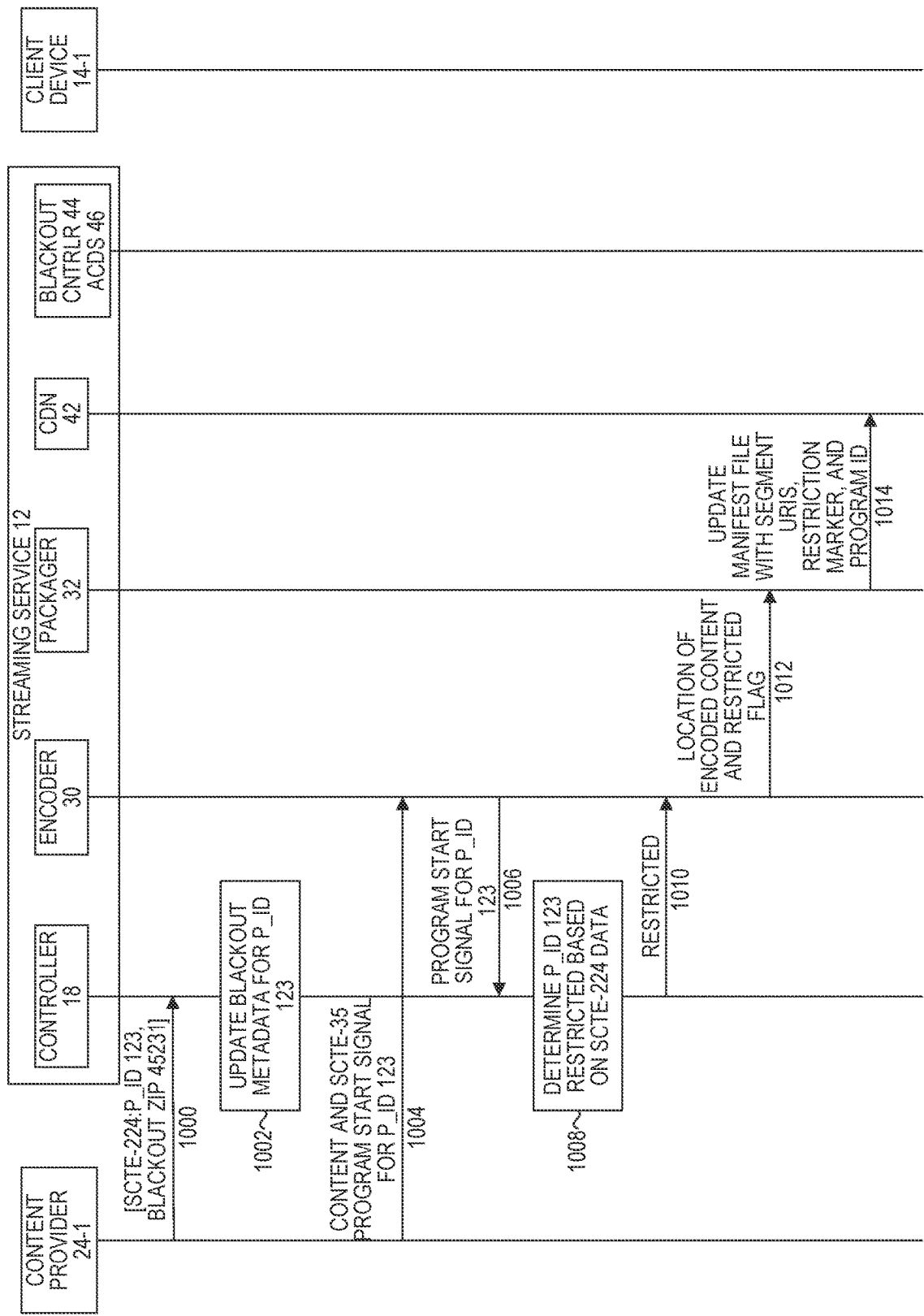
FIGS. 2A and 2B illustrate a message flow diagram illustrating actions taken and messages communicated between various components illustrated in FIG. 1, according to one embodiment.
Figure 2B:
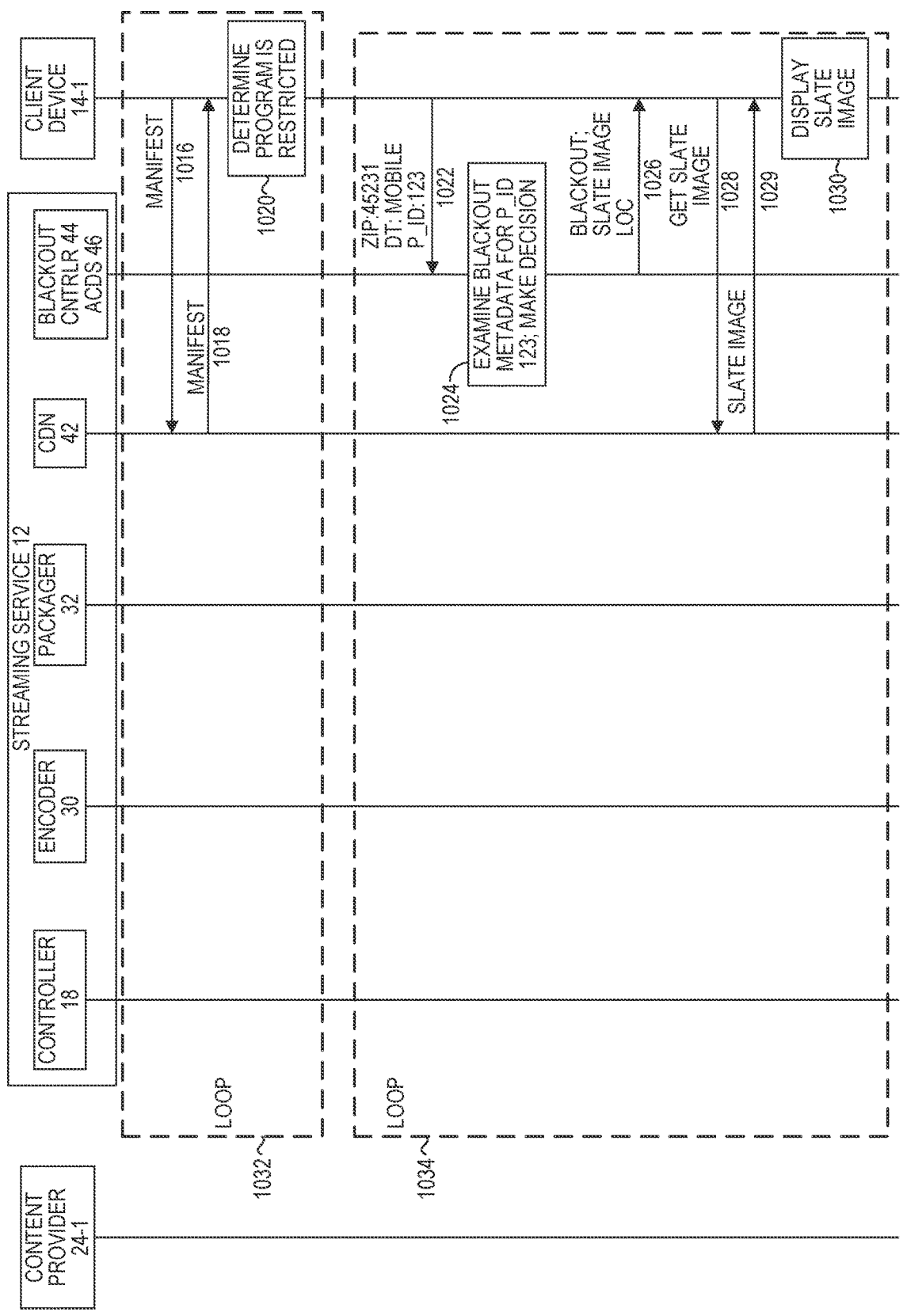

FIGS. 2A and 2B illustrate a message flow diagram illustrating actions taken and messages communicated between various components illustrated in FIG. 1, according to one embodiment. Referring first to FIG. 2A, the content provider 24-1 sends metadata 20, including the blackout metadata 26, to the controller 18 (block 1000). The controller 18 stores the blackout metadata 26 in conjunction with a program identifier of the program(s) to which the blackout metadata 26 corresponds, in the blackout metadata 28 (block 1002). Subsequently, the content provider 24-1 provides a program start signal indicating that a program having a program identifier (P_ID) of 123 is being provided to the encoder 30 (block 1004). The encoder 30 sends the P_ID to the controller 18 (block 1006). The controller 18 accesses the blackout metadata 28 and determines, based on the P_ID, that the program is restricted (block 1008). The controller 18 sends a message to the encoder 30 indicating that the program is restricted (block 1010). The encoder 30 encodes the program and sends a message to the packager 32 indicating the location of the encoded program and information that indicates that the program is restricted (block 1012).

The packager 32 updates the manifest 34-1 with location information of the encoded program, such as with URIs that identify locations of segments of the encoded program. The packager 32 also updates the manifest 34-1 with a restriction marker, and with the program identifier (block 1014). Referring now to FIG. 2B, the client device 14-1 sends a message to the CDN 42 requesting the manifest 34-1 associated with the content provider 24-1 (block 1016). The CDN 42 provides the manifest 34-1 to the client device 14-1 (block 1018). The client device 14-1 determines, based on the restriction marker in the manifest 34-1, that the program currently being streamed on the requested channel or feed is restricted (block 1020).

Because the program is restricted, the client device 14-1 extracts the program identifier from the manifest 34-1 and sends an authorization message to the blackout controller 44 (block 1022). The authorization message includes the program identifier and client device metadata in the form of a zip code that identifies a current geographic location of the client device 14-1 and device type of the client device 14-1. The blackout controller 44 communicates with the ACDS 46 to determine whether the client device 14-1 is authorized to receive the program. The ACDS 46 accesses the blackout metadata 28 and, based on the program identifier, the blackout metadata that corresponds to the program, and the client metadata, and determines that the client device 14-1 is not authorized to view the program (e.g., the program is blacked out for the client device 14-1) (block 1024). The blackout controller 44 sends a message to the client device 14-1 indicating that the program is blacked out. The message also includes a location of the slate image 48 that is to be presented in lieu of the program (block 1026). The client device 14-1 obtains the slate image 48 and presents the slate image 48 in lieu of the program on the display device 40-1 (blocks 1028, 1029, 1030).

Unless another channel or feed is selected, the client device 14-1 performs two loops. The client device 14-1 continuously performs a loop 1032 requesting and receiving the manifest 34-1 from the CDN 42. This loop may be performed periodically, such as every five seconds, six seconds, ten seconds, or the like. The manifest 34-1 will eventually be updated by the packager 32 to indicate that another program associated with the content provider 24-1 is now being streamed by the streaming service 12, and the program may not be restricted, or the client device 14-1 may not be blacked out from such program.

So long as the manifest 34-1 continues to identify the program as being restricted, the client device 14-1, concurrently with the loop 1032, performs a loop 1034 requesting authorization to the program. This loop may be performed periodically, such as every twenty seconds, thirty seconds, forty seconds, or the like. The client device 14-1 performs the loop 1034 because the content provider 24-1 may, at any time, alter the blackout criteria associated with the program, and the client device 14-1 may subsequently be authorized to view the program.

Figure 3:
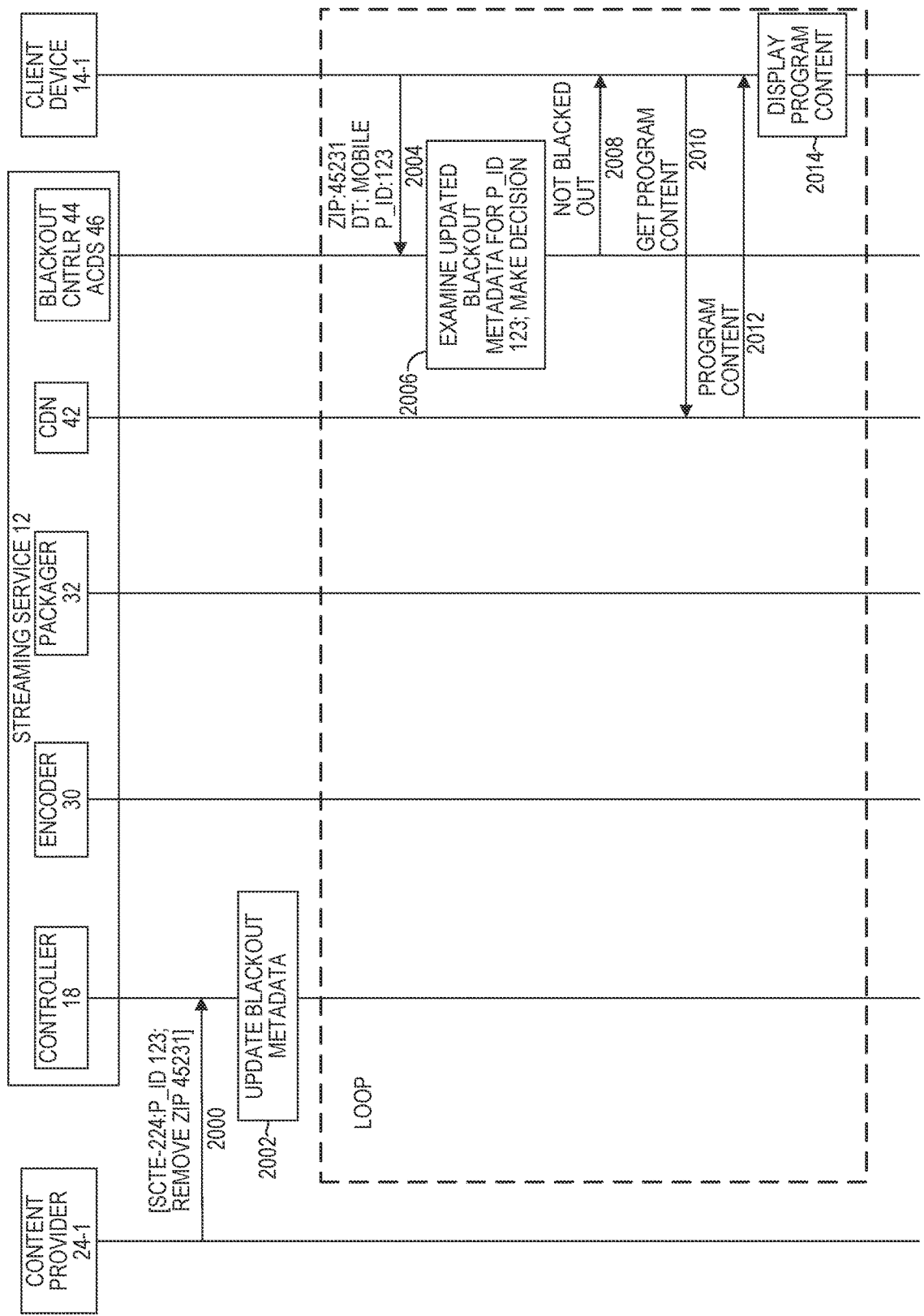
FIG. 3 illustrates a message flow diagram illustrating actions taken and messages communicated between various components illustrated in FIG. 1 for one potential sequence of events that may occur after the sequence of events illustrated in FIGS. 2A and 2B, according to one embodiment.

FIG. 3 illustrates a message flow diagram illustrating actions taken and messages communicated between various components illustrated in FIG. 1 for one potential sequence of events that may occur after the sequence of events illustrated in FIGS. 2A and 2B, according to one embodiment. In this example, the client device 14-1 remains tuned or otherwise selected to the channel or feed associated with the content provider 24-1, and, as illustrated in FIG. 2B, periodically performs the loops 1032 and 1034. The content provider 24-1 sends a message to the controller 18 with updated blackout metadata that indicates that the geographic location associated with the zip code 45231 (that of the client device 14-1) is now authorized to view the program (block 2000). The controller 18 updates the blackout metadata 28 accordingly (block 2002).

As discussed above with regard to FIG. 2B, the client device 14-1 periodically requests authorization to receive the program (i.e., the loop 1034). The client device 14-1 sends an authorization message to the blackout controller 44. The authorization message includes the program identifier and client device metadata in the form of a zip code that identifies the current geographic location of the client device 14-1, and device type of the client device 14-1 (block 2004). The blackout controller 44 communicates with the ACDS 46 to determine whether the client device 14-1 is authorized to receive the program. The ACDS 46 accesses the blackout metadata 28 and, based on the program identifier, the updated blackout metadata that corresponds to the program, and the client metadata, determines that the client device 14-1 is now authorized to view the program (e.g., the program is no longer blacked out for the client device 14-1) (block 2006). The blackout controller 44 sends a message to the client device 14-1 indicating that the client device 14-1 is authorized to view the program (block 2008). The client device 14-1 accesses the manifest 34-1 and determines the location of the encoded program. In this example, the location of the encoded program is associated with the CDN 42. The client device 14-1 requests the encoded program from the CDN 42 (block 2010). The CDN 42 provides the program to the client device 14-1 (block 2012). The client device 14-1 presents the program on the display device 40-1 (block 2014).

Figure 4:
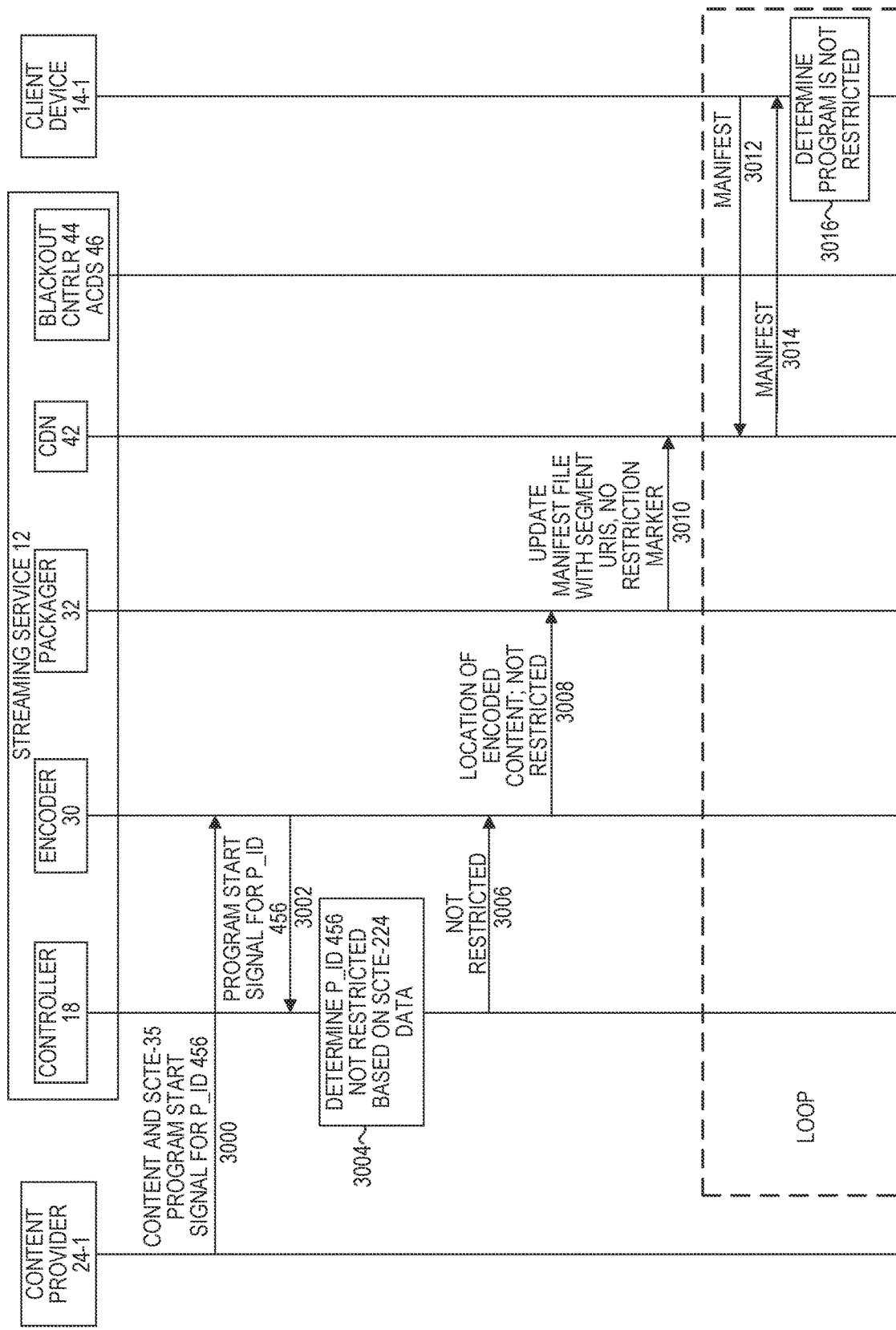
FIG. 4 illustrates a message flow diagram illustrating actions taken and messages communicated between various components illustrated in FIG. 1 for a different potential sequence of events from that illustrated in FIG. 3, according to one embodiment.

FIG. 4 illustrates a message flow diagram illustrating actions taken and messages communicated between various components illustrated in FIG. 1 for a different potential sequence of events from that illustrated in FIG. 3, according to one embodiment. In this example, the client device 14-1 again remains tuned or otherwise selected to the channel or feed associated with the content provider 24-1, and is, as illustrated in FIG. 2B, performing the loops 1032 and 1034. In this example, the restricted program that was being streamed by the streaming service 12 ends, and the content provider 24-1 begins providing a different program to the encoder 30. The content provider 24-1 provides a program start signal indicating that a program having a program identifier (P_ID) of 456 is now being provided to the encoder 30 (block 3000). The encoder 30 sends the P_ID to the controller 18 (block 3002). The controller 18 accesses the blackout metadata 28 and determines, based on the P_ID, that the program is not restricted (block 3004). The controller 18 sends a message to the encoder 30 indicating that the program is not restricted (block 3006). The encoder 30 encodes the program and sends a message to the packager 32 indicating the location of the encoded program and omits information that indicates that the program is restricted, or alternatively, affirmatively provides information that indicates that the program is not restricted (block 3008). The packager 32 updates the manifest 34-1 with location information of the encoded program, such as with URIs that identify locations of segments of the encoded program, that does not include the restriction marker (block 3010).

The client device 14-1 sends a message to the CDN 42 requesting the manifest associated with the content provider 24-1 (block 3012). The CDN 42 provides the manifest 34-1 to the client device 14-1 (block 3014). The client device 14-1 determines, based on the manifest 34-1, that the program currently being streamed on the requested channel or feed is not restricted (block 3016). The client device 14-1, using the location information in the manifest 34-1, obtains the encoded program from the CDN 42 and begins presenting the program on the display device 40-1.

Figure 5:
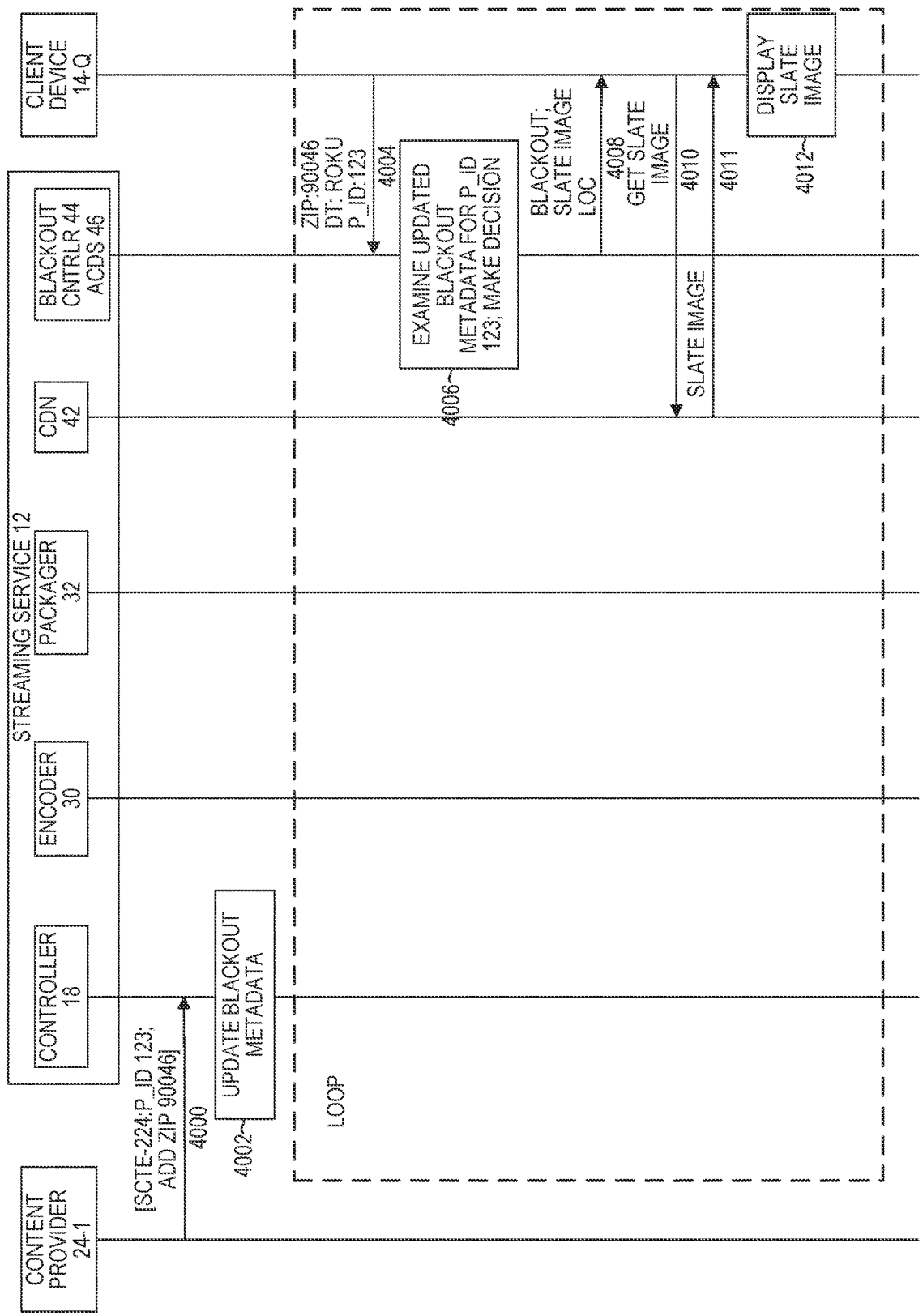
FIG. 5 illustrates a message flow diagram illustrating actions taken and messages communicated between various components illustrated in FIG. 1 for another potential sequence of events that may occur after the sequence of events illustrated in FIGS. 2A and 2B, according to one embodiment.

FIG. 5 illustrates a message flow diagram illustrating actions taken and messages communicated between various components illustrated in FIG. 1 for another potential sequence of events that may occur after the sequence of events illustrated in FIGS. 2A and 2B, according to one embodiment. For purposes of illustration assume, as discussed with reference to FIG. 1, that the client device 14-Q, unlike the client device 14-1, is not initially blacked out from watching the program. The client device 14-Q thus receives authorization from the blackout controller 44 to present the program, and the client device 14-Q presents the program on the display device 40-Q, while the client device 14-1 is presenting the slate image 48 on the display device 40-1.

The client device 14-Q however also performs the loops 1032 and 1034 discussed with reference to FIG. 2B, because the manifest 34-1 will eventually be updated with information regarding another program that is provided on the selected channel or feed, and because the blackout metadata could be altered by the content provider 24-1 in a manner that would affect the client device 14-Q. In this example, while the program is being presented on the display device 40-Q, the content provider 24-1 sends a message to the controller 18 with updated blackout metadata that indicates the geographic location associated with the zip code 90046 (that of the client device 14-Q) is no longer authorized to view the program (block 4000). The controller 18 updates the blackout metadata 28 accordingly (block 4002). The client device 14-Q is performing the loop 1034 discussed above with regard to FIG. 2B. The client device 14-Q sends an authorization message to the blackout controller 44. The authorization message includes the program identifier, client device metadata in the form of a zip code that identifies the current geographic location of the client device 14-Q, and the device type of the client device 14-Q (block 4004). The blackout controller 44 communicates with the ACDS 46 to determine whether the client device 14-Q is authorized to receive the program. The ACDS 46 accesses the blackout metadata 28 and, based on the program identifier, the updated blackout metadata that corresponds to the program, and the client metadata, determines that the client device 14-Q is no longer authorized to view the program (e.g., the program is now blacked out for the client device 14-Q) (block 4006). The blackout controller 44 sends a message to the client device 14-Q indicating that the program is blacked out. The message also includes a location of the slate image 48 that is to be presented in lieu of the program (block 4008). The client device 14-Q obtains the slate image 48 and presents the slate image 48 in lieu of the program on the display device 40-Q (blocks 4010, 4011, 4012).

Figure 6:
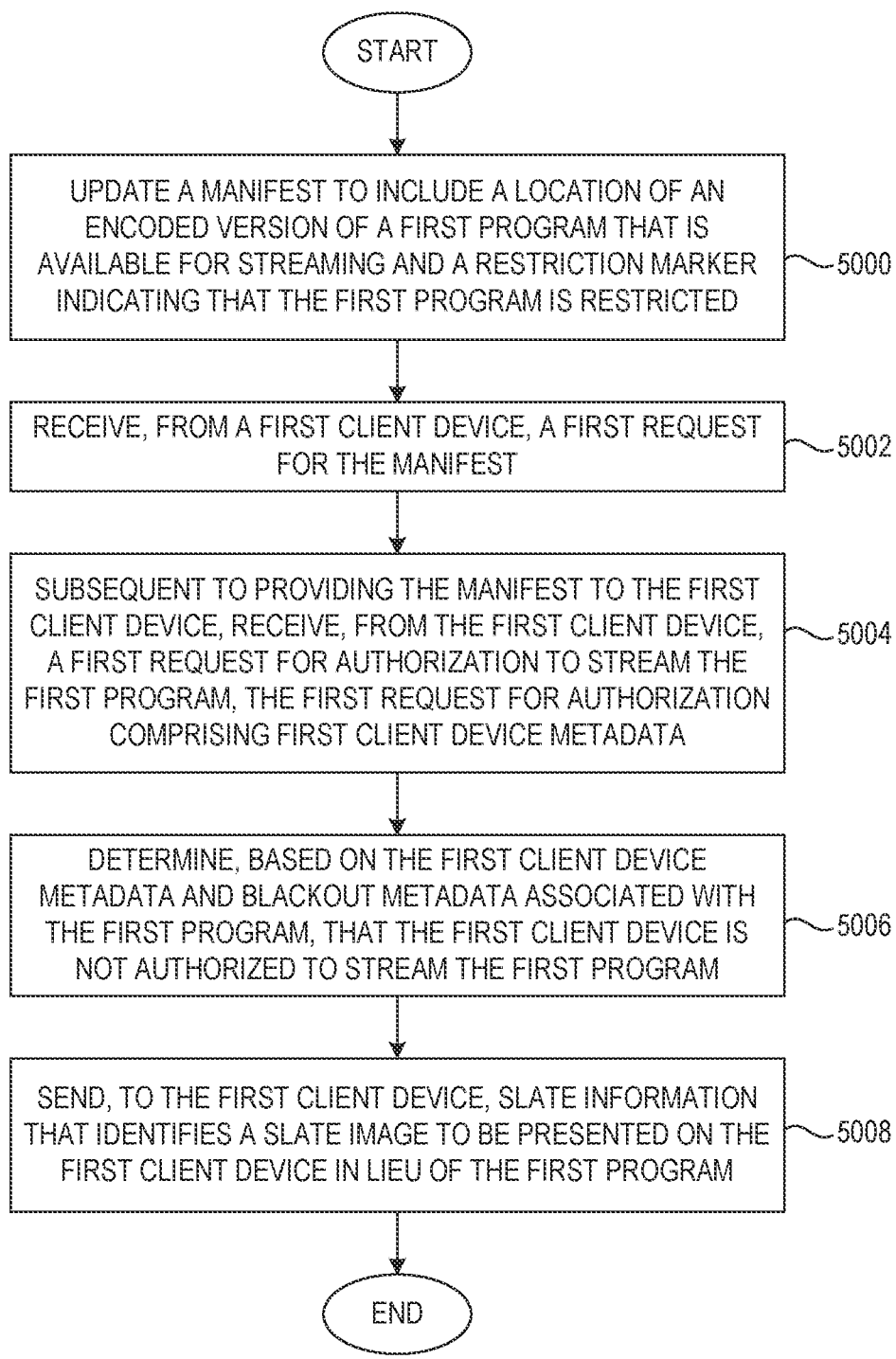
FIG. 6 is a flowchart of a method for client-side blackout using manifest markers from the perspective of a streaming service, according to one embodiment.

FIG. 6 is a flowchart of a method for client-side blackout using manifest markers from the perspective of a streaming service, according to one embodiment. FIG. 6 will be discussed in conjunction with FIG. 1. The streaming service 12 updates the manifest 34-1 to include a location of an encoded version of a program that is available for streaming and a restriction marker indicating that the program is restricted (FIG. 6, block 5000). The streaming service 12 receives, from the client device 14-1, a request for the manifest 34-1 (FIG. 6, block 5002). The streaming service 12, subsequent to providing the manifest 34-1 to the client device 14-1, receives, from the client device 14-1, a request for authorization to stream the program, the request comprising client device metadata (FIG. 6, block 5004). The streaming service 12 determines, based on the client device metadata and the blackout metadata 28 associated with the program, that the client device 14-1 is not authorized to stream the program (FIG. 6, block 5006). The streaming service 12 sends, to the client device 14-1, slate information that identifies the slate image 48 to be presented by the client device 14-1 in lieu of the program (FIG. 6, block 5008).

Figure 7:
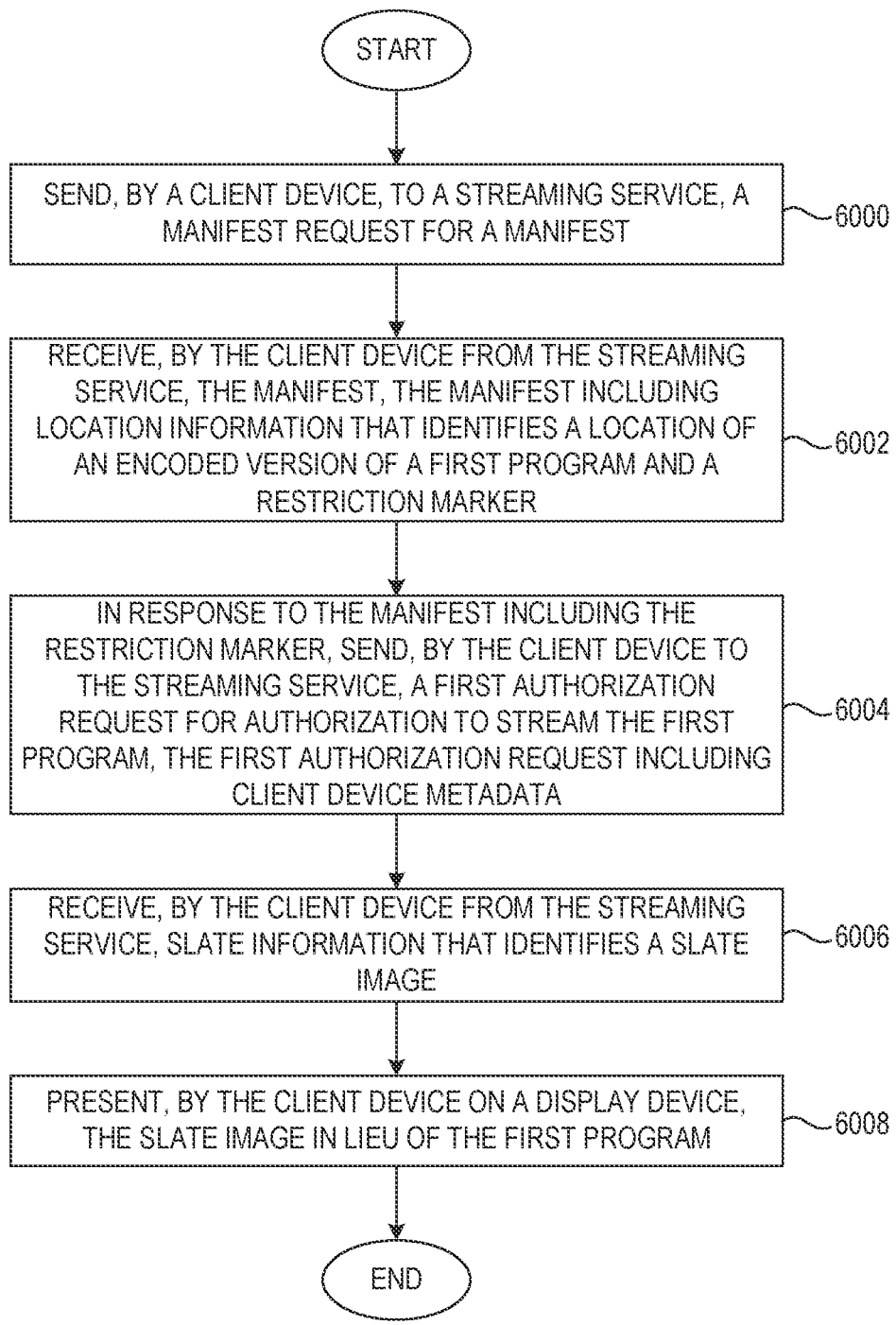
FIG. 7 is a flowchart of a method for client-side blackout using manifest markers from the perspective of a client device, according to one embodiment.

FIG. 7 is a flowchart of a method for client-side blackout using manifest markers from the perspective of the client device 14-1, according to one embodiment. FIG. 7 will be discussed in conjunction with FIG. 1. The client device 14-1 sends, to the streaming service 12, a manifest request for a manifest 34 associated with the content provider 24-1 (FIG. 7, block 6000). The client device 14-1 receives, from the streaming service 12, the manifest 34-1, the manifest 34-1 including location information that identifies a location of an encoded version of the program currently being provided on a channel or feed associated with the content provider 24-1, and a restriction marker (FIG. 7, block 6002). The client device 14-1, in response to the manifest 34-1 including the restriction marker, sends, to the streaming service 12, an authorization request for authorization to stream the program, the authorization request including client device metadata (FIG. 7, block 6004). The client device 14-1 receives, from the streaming service 12, the slate information that identifies the slate image 48 (FIG. 7, block 6006). The client device 14-1 presents, on the display device 40-1, the slate image 48 in lieu of the program (FIG. 7, block 6008).

Figure 8:
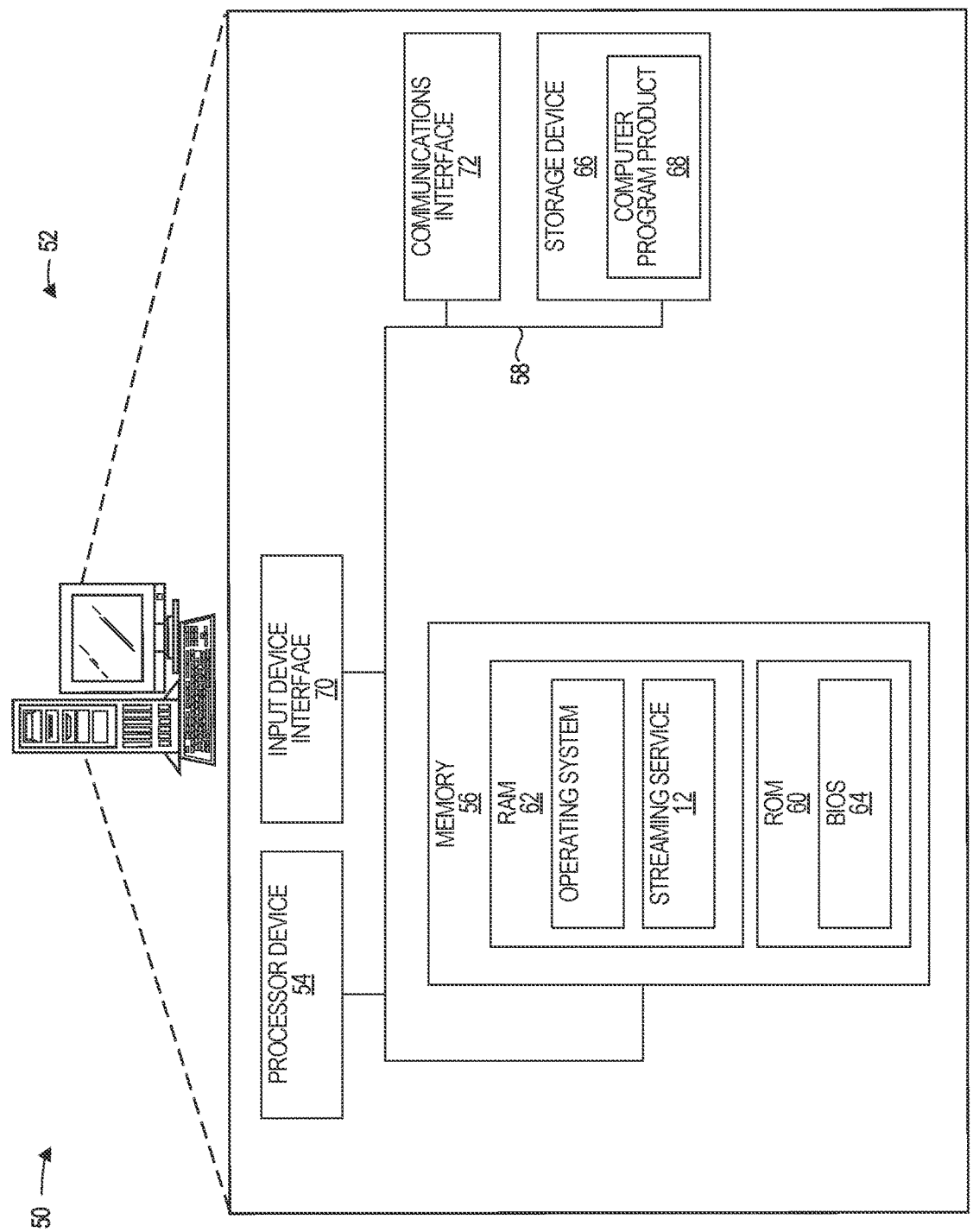
FIG. 8 is a block diagram of a computer system suitable for implementing the embodiments disclosed herein.

FIG. 8 is a block diagram of a computer system 50 suitable for implementing the embodiments discloses herein. The computer system 50 includes one or more computing devices 52, each of which includes one or more processor devices 54. The streaming service 12 may be implemented on a single computing device 52, or components of the streaming service 12 may be distributed across a plurality of computing devices 52. Thus, the streaming service 12 may be implemented on a computer system 50 that includes one or more processor devices 54 of one or more computing devices 52. Because the streaming service 12 comprises one or more components of the computer system 50, functionality implemented by the streaming service 12 may be attributed herein to the computer system 50 generally. Moreover, in examples where the streaming service 12 comprises software instructions that program the one or more processor devices 54 to carry out functionality discussed herein, functionality implemented by the streaming service 12 may be attributed herein to the one or more processor devices 54 of the computer system 50.

The computing device 52 may comprise any computing or electronic device capable of including firmware, hardware, and/or executing software instructions to implement the functionality described herein, such as a computer server, a desktop computing device, or the like. The computing device 52 includes the one or more processor devices 54, a system memory 56, and a system bus 58. The system bus 58 provides an interface for system components including, but not limited to, the system memory 56 and the one or more processor devices 54. The one or more processor devices 54 can be any commercially available or proprietary processor.

The system bus 58 may be any of several types of bus structures that may further interconnect to a memory bus (with or without a memory controller), a peripheral bus, and/or a local bus using any of a variety of commercially available bus architectures. The system memory 56 may include non-volatile memory 60 (e.g., read-only memory (ROM), erasable programmable read-only memory (EPROM), electrically erasable programmable read-only memory (EEPROM), etc.), and volatile memory 62 (e.g., random-access memory (RAM)). A basic input/output system (BIOS) 64 may be stored in the non-volatile memory 60 and can include the basic routines that help to transfer information between elements within the computing device 52. The volatile memory 62 may also include a high-speed RAM, such as static RAM, for caching data.

The computing device 52 may further include or be coupled to a non-transitory computer-readable storage medium such a storage device 66, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 66 and other drives associated with computer-readable media and computer-usable media may provide non-volatile storage of data, data structures, computer-executable instructions, and the like.

A number of modules can be stored in the storage device 66 and in the volatile memory 62, including an operating system and one or more program modules, such as the streaming service 12, which may implement the functionality described herein in whole or in part. All or a portion of the examples may be implemented as a computer program product 68 stored on a transitory or non-transitory computer-usable or computer-readable storage medium, such as the storage device 66, which includes complex programming instructions, such as complex computer-readable program code, to cause the one or more processor devices 54 to carry out the steps described herein. Thus, the computer-readable program code can comprise software instructions for implementing the functionality of the examples described herein when executed on the one or more processor devices 54. The one or more processor devices 54, in conjunction with the streaming service 12 in the volatile memory 62, may serve as a controller, or control system, for the computing device 52 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the one or more processor devices 54 through an input device interface 70 that is coupled to the system bus 58 but can be connected by other interfaces such as a parallel port, an Institute of Electrical and Electronic Engineers (IEEE) 1394 serial port, a Universal Serial Bus (USB) port, an IR interface, and the like. The computing device 52 may also include one or more communications interfaces 72 suitable for communicating with other computing devices 52 and client devices 14.

Individuals will recognize improvements and modifications to the preferred examples of the disclosure. All such improvements and modifications are considered within the scope of the concepts disclosed herein and the claims that follow.

What is claimed is:

1. A method comprising:
   updating, by a streaming service executing on a computer system comprising one or more processor devices of one or more computing devices, a manifest to include a location of an encoded version of a first program that is available for streaming and a restriction marker indicating that the first program is restricted;
   receiving, by the streaming service from a first client device, a first request for the manifest;
   subsequent to providing the manifest to the first client device, receiving, by the streaming service from the first client device, a first request for authorization to stream the first program, the first request for authorization comprising first client device metadata;
   determining, by the streaming service based on the first client device metadata and blackout metadata associated with the first program, that the first client device is not authorized to stream the first program; and
   sending, by the streaming service to the first client device, slate information that identifies a slate image to be presented by the first client device in lieu of the first program.

2. The method of claim 1, wherein the slate image comprises a static bitmapped graphic image.

3. The method of claim 1 further comprising:
subsequent to receiving the first request for authorization to stream the first program, receiving, by the streaming service, updated blackout metadata associated with the first program;
receiving, by the streaming service from the first client device, a second request for authorization to stream the first program, the second request comprising the first client device metadata;
determining, based on the first client device metadata and the updated blackout metadata associated with the first program, that the first client device is authorized to stream the first program; and
sending, by the streaming service to the first client device, information that indicates that the first client device is authorized to stream the first program.

4. The method of claim 1 wherein the first client device metadata comprises device location information of a geographic location of the first client device, and wherein determining, based on the first client device metadata and the blackout metadata associated with the first program, that the first client device is not authorized to stream the first program comprises determining that the geographic location of the first client device is identified in the blackout metadata as a geographic location in which the first program is not authorized to be streamed.

5. The method of claim 1 wherein the first client device metadata comprises a device type of the first client device, and wherein determining, based on the first client device metadata and the blackout metadata associated with the first program, that the first client device is not authorized to stream the first program comprises determining that the device type is identified in the blackout metadata as a device type to which the first program is not authorized to be streamed.

6. The method of claim 1 further comprising:
updating, by the streaming service, the manifest to generate an updated manifest that identifies a location of an encoded version of a second program that is not restricted, the streaming service further updating the updated manifest such that the updated manifest does not have the restriction marker;
subsequently receiving, by the streaming service from the first client device, a second request for the manifest;
sending, by the streaming service to the first client device, the updated manifest; and
receiving, by the streaming service from the first client device, a request for video content of the second program in lieu of a request from the first client device for authorization to stream the second program.

7. The method of claim 1 further comprising:
receiving, by the streaming service, the blackout metadata that indicates that the first program is restricted; and
wherein updating the manifest to include the restriction marker comprises updating the manifest to include the restriction marker based on the blackout metadata.

8. The method of claim 7 further comprising receiving the blackout metadata prior to receiving the first program from a content provider.

9. The method of claim 1 further comprising:
receiving, from a content provider, a stream of data that includes a program start signal that identifies the first program and indicates that the first program is being streamed to the streaming service by the content provider;
accessing the blackout metadata associated with the first program that indicates the first program is restricted;
determining, based on the program start signal and the blackout metadata, that the first program is restricted; and
wherein the manifest is updated to include the restriction marker in response to determining that the first program is restricted.

10. The method of claim 1 further comprising:
receiving, by the streaming service from a second client device, a request for the manifest;
subsequent to providing the manifest to the second client device, receiving, from the second client device, a request for authorization to stream the first program, the request for authorization comprising second client device metadata;
determining, based on the second client device metadata and the blackout metadata associated with the first program, that the second client device is permitted to stream the first program; and
sending, by the streaming service to the second client device, information that indicates that the second client device is authorized to stream the first program.

11. The method of claim 10 further comprising:
subsequent to receiving the request for authorization to stream the first program from the second client device, receiving, by the streaming service, updated blackout metadata associated with the first program;
receiving, by the streaming service from the second client device, a request for authorization to stream the first program, the request for authorization comprising the second client device metadata and a program identifier that identifies the first program;
determining, based on the second client device metadata and the updated blackout metadata associated with the first program, that the second client device is not authorized to stream the first program; and
sending, by the streaming service to the second client device, slate information that identifies a slate image to be presented on the second client device in lieu of the first program.

12. The method of claim 1 wherein the slate image comprises information indicating that the first program cannot be presented on the first client device.

13. A computer system comprising:
one or more computing devices, the one or more computing devices comprising one or more processor devices, the one or more processor devices configured to:
update a manifest to include a location of an encoded version of a first program that is available for streaming and a restriction marker indicating that the first program is restricted;
receive, from a first client device, a first request for the manifest;
subsequent to providing the manifest to the first client device, receive, from the first client device, a first request for authorization to stream the first program, the first request for authorization comprising first client device metadata;
determine, based on the first client device metadata and blackout metadata associated with the first program, that the first client device is not authorized to stream the first program; and
send, to the first client device, slate information that identifies a slate image to be presented by the first client device in lieu of the first program.

14. The computer system of claim 13, wherein the one or more processor devices are further configured to:
  receive the blackout metadata that indicates that the first program is restricted; and
  wherein to update the manifest to include the restriction marker, the processor devices are further configured to update the manifest to include the restriction marker based on the blackout metadata.

15. The computer system of claim 13, wherein the one or more processor devices are further configured to:
  subsequent to receiving the first request for authorization to stream the first program, receive updated blackout metadata associated with the first program;
  receive, from the first client device, a second request for authorization to stream the first program, the second request comprising the first client device metadata;
  determine, based on the first client device metadata and the updated blackout metadata associated with the first program, that the first client device is authorized to stream the first program; and
  send, to the first client device, information that indicates that the first client device is authorized to stream the first program.

16. The computer system of claim 13, wherein the one or more processor devices are further configured to update the manifest to generate an updated manifest that identifies a location of an encoded version of a second program that is not restricted, the streaming service further updating the updated manifest such that the updated manifest does not have the restriction marker.

17. The computer system of claim 13, wherein the first client device metadata comprises device location information of a geographic location of the first client device, and wherein determining, based on the first client device metadata and the blackout metadata associated with the first program, that the first client device is not authorized to stream the first program comprises determining that the geographic location of the first client device is identified in the blackout metadata as a geographic location in which the first program is not authorized to be streamed.

18. A method comprising:
  sending, by a client device comprising a computing device and a processor device, to a streaming service, a manifest request for a manifest;
  receiving, by the client device from the streaming service, the manifest, the manifest including location information that identifies a location of an encoded version of a first program and a restriction marker;
  in response to detecting that the manifest includes the restriction marker, sending, by the client device to the streaming service, a first authorization request for authorization to stream the first program, the first authorization request including client device metadata;
  receiving, by the client device from the streaming service, slate information that identifies a slate image; and
  presenting, by the client device on a display device, the slate image in lieu of the first program.

19. The method of claim 18 wherein the client device metadata comprises device location information that identifies a geographic location of the client device.

20. The method of claim 18 wherein the client device metadata comprises a device type of the client device.

21. The method of claim 18 further comprising:
  sending, by the client device to the streaming service, a second authorization request for authorization to stream the first program, the second authorization request including the client device metadata;
  receiving, by the client device from the streaming service, information that indicates that the client device is authorized to stream the first program;
  accessing, by the client device, the encoded version of the first program based on the location information that identifies the location of the encoded version of the first program; and
  presenting, on the display device, the encoded version of the first program.

22. A client device comprising a computing device and a processor device, the processor device configured to:
  send, to a streaming service, a manifest request for a manifest;
  receive, from the streaming service, the manifest, the manifest including location information that identifies a location of an encoded version of a first program and a restriction marker;
  in response to detecting that the manifest includes the restriction marker, send, to the streaming service, a first authorization request for authorization to stream the first program, the first authorization request including client device metadata;
  receive, from the streaming service, slate information that identifies a slate image; and
  present, on a display device, the slate image in lieu of the first program.

\* \* \* \* \*